CLEMENT C. CLAWSON.
Improvement in Rotary Ice Shavers.
No. 118,689.      Patented Sep. 5, 1871.
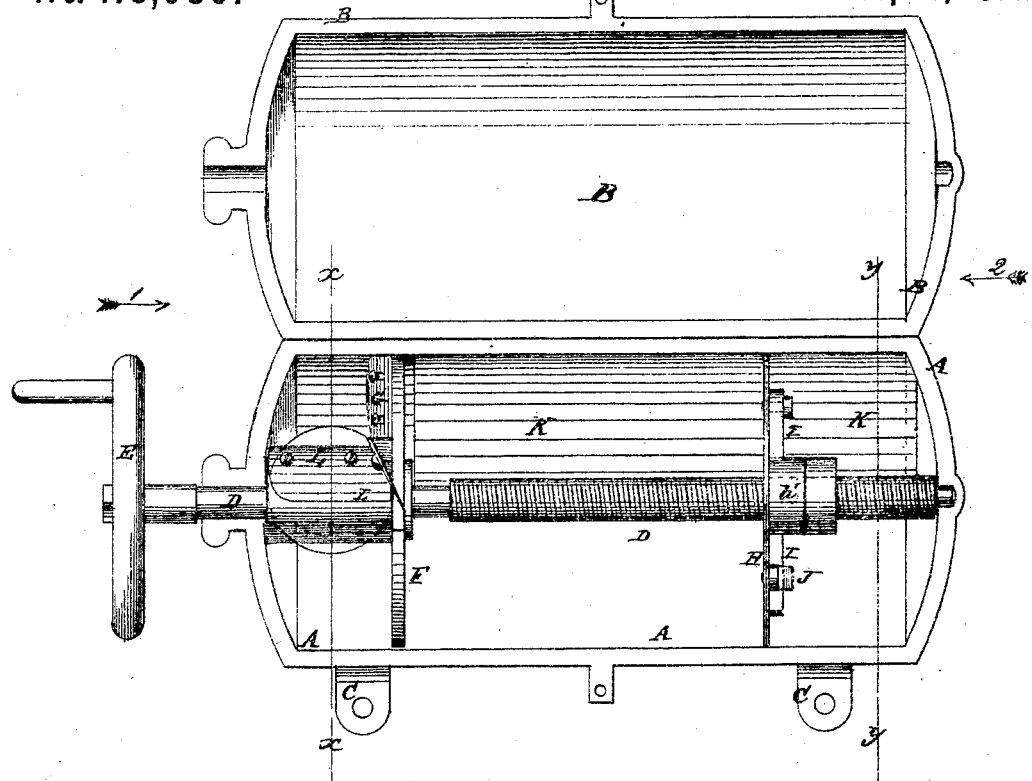
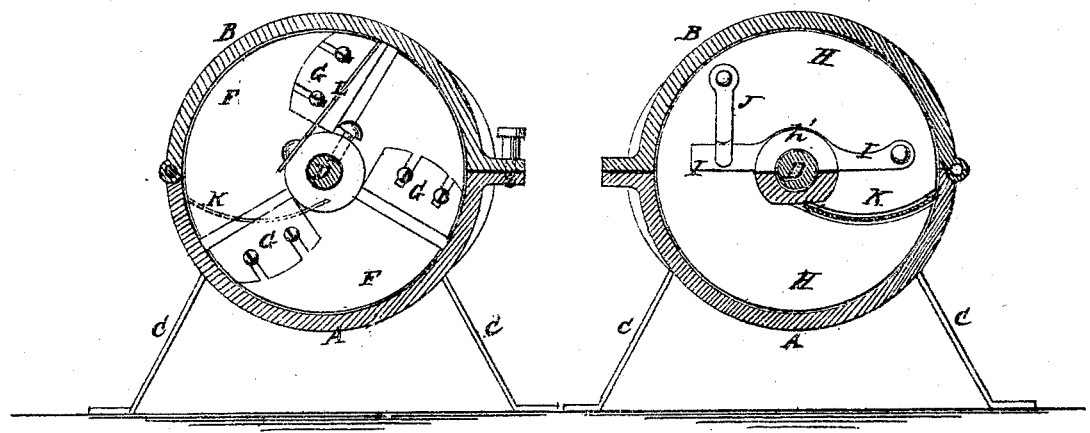
Witnesses:
A. W. Almqvist
Francis McArdle
Inventor:
Clement C. Clawson
PER
Attorneys.

UNITED STATES PATENT OFFICE.

CLEMANT C. CLAWSON, OF RALEIGH, NORTH CAROLINA.

IMPROVEMENT IN ROTARY ICE-SHAVERS.

Specification forming part of Letters Patent No. 118,689, dated September 5, 1871.

*To all whom it may concern:*

Be it known that I, CLEMANT C. CLAWSON, of Raleigh, in the county of Wake and State of North Carolina, have invented a new and useful Improvement in Rotary Ice-Shaver; and I do hereby declare that the following is a full, clear, and exact description thereof, which will enable others skilled in the art to make and use the same, reference being had to the accompanying drawing forming part of this specification.

Figure 1 is a top view of my improved ice-shaver, the cover being turned back. Fig. 2 is a detail cross-section of the same taken through the line $x\ x$ and looking in the direction of arrow 1. Fig. 3 is a detail cross-section of the same taken through the line $y\ y$ and looking in the direction of arrow 2.

Similar letters of reference indicate corresponding parts.

My invention has for its object to furnish an improved machine for shaving ice, designed for use in saloons, bars, private houses, and other places where fine ice may be required, and which shall be simple in construction, convenient in use, and effective in operation; and it consists in the construction and combination of the various parts of the machine, as hereinafter more fully described.

A B is the body of the machine, which is made in the general form of a cylinder with rounded or convex ends, the lower part or half A serving as the ice-receptacle, and the upper part B serving as a cover. The parts A B are hinged to each other at their rear edges, and are fastened to each other at their forward edges by any convenient fastening. The machine is provided with legs C formed upon or attached to its lower part A, which legs may be of any desired length. D is a shaft, which passes longitudinally through the machine, and the bearings for which are formed in the ends of the body A B, half being in the upper and half in the lower edges of the ends of the said parts. One end of the shaft D projects, and to it is attached a crank-wheel, E, by which the machine is operated, and which may be made heavy, to adapt it to serve as a fly-wheel. To the shaft D, at a little distance from the forward end of the box, is attached a disk, E, which is slotted, as shown in Fig. 2, to receive the knives or cutters G, which are attached to the outer side of the disk F, and project through the said slots to act upon the ice at the other or inner side of the said disk. Upon the shaft D, from near the disk F to its other end, is cut a screw-thread, which fits into the screw-thread formed in the middle part of the hub of the disk H, so that the said disk H may be moved back and forth by turning the shaft D. The upper part $h'$ of the nut in the hub of the disk F is movable, being formed upon a lever, I, which is pivoted at one end to the side of the disk, and its other end is locked, when thrown down by a button, J, pivoted to the said disk H, as shown in Fig. 3. By this construction, by raising the lever I the disk H may be pushed back to the rear end of the body A B without waiting to run it back by turning the shaft D. The disk H is kept from being revolved by the revolution of the shaft D by a partition, K, the outer edge of which is attached to the side of the part A, and its inner edge terminates just below the shaft D. The partition K enters a slot in the disk H, as shown in Fig. 3, so that the said disk H slides upon the said partition K as it is moved back and forth.

In using the machine the ice to be shaved is put in the lower part of the body A, between the disks F and H, and the shaft D is revolved by means of the crank-wheel E. This draws the disk H forward and presses the ice against the disk F, where it is shaved by the cutters G. The fine ice passes through the slot of the disk F into the space between the said disk and the forward end of the body of the machine. To the shaft D, between the disk F and the forward end of the body A B, is attached a plate, L, which scrapes the fine ice out through the hole in the bottom of the part A, where it may be received in a glass or other receiver.

Having thus described my invention, I claim as new and desire to secure by Letters Patent—

1. The guide partition K, in combination with the slotted feed-disk H and part A of the body of the machine, substantially as herein shown and described, and for the purpose set forth.

2. The scraper-plate L, in combination with the knife-disk F, shaft D, and body A B of the machine, substantially as herein shown and described and for the purpose set forth.

3. The combination of the lever I and button

J with the movable half $h'$ of the nut of the disk H, and with the disk H, substantially as herein shown and described, and for the purpose set forth.

4. The combination of the body A B, swiveled screw-shaft D, crank-wheel E, slotted knife-disk F, knives G, slotted feed-disk H, and partition K with each other, substantially as herein shown and described, and for the purpose set forth.

CLEMANT C. CLAWSON.

Witnesses:
C. C. PREMPERT,
G. W. TAYLOR.